United States Patent
Cangiani et al.

(10) Patent No.: US 6,335,951 B1
(45) Date of Patent: Jan. 1, 2002

(54) PROGRAMMABLE WAVEFORM GENERATOR FOR A GLOBAL POSITIONING SYSTEM

(75) Inventors: Gene L. Cangiani, Parsippany; John A. Rajan, Wayne, both of NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/205,510

(22) Filed: Dec. 4, 1998

(51) Int. Cl.[7] .............................................. H04L 27/36
(52) U.S. Cl. .................. 375/298; 375/308; 342/357.06; 342/375.12
(58) Field of Search ................................. 375/308, 279, 375/298; 342/357, 361, 357.06, 357.12

(56) References Cited

U.S. PATENT DOCUMENTS 5,920,237 A * 7/1999 Park et al. ................... 332/103

OTHER PUBLICATIONS

Ananda, et al., "Combined Transmission of DOD–FAA Signal Structures from CAG", Institute of Navigation, pp., 251–260, 1994.

Ananda, et al., "Proposed GPS Integrity and Navigation Payload on DSCS", 1993 IEEE Military Communications Conference, Oct., 1993.

Aparicio, et al., "Communication Satellite Augmented GPS Payload Architecture", Proceedings of Ion GPS–94, pp. 1007–1016, Sep. 1994.

* cited by examiner

*Primary Examiner*—Chi Pham
*Assistant Examiner*—Dung X. Nguyen (57) ABSTRACT

A method for generating a global positioning signal from a space based craft including the steps of generating a plurality of binary modulating signals using a waveform generator; separately modulating an in-phase component of a desired carrier of the global positioning signal to be generated with at least a first binary, modulating signal selected from the plurality to generate at least one corresponding in-phase modulated signal component; separately modulating a quadrature component of the carrier with at least a second binary modulating signal selected from the plurality to generate at least one corresponding quadrature modulated signal component; and, combining the at least one in-phase modulated signal component and the at least one quadrature modulated signal component to generate the global positioning signal; wherein the global positioning signal has a constant envelope.

47 Claims, 12 Drawing Sheets

FIG.1 *PRIOR ART*

CONVENTIONAL ARCHITECTURE—"SOFTWARE RADIO" APPROACH

PROGRAMMABLE WAVEFORM GENERATOR FOR A GLOBAL POSITIONING SYSTEM

FIELD OF INVENTION

This invention relates to Global Positioning Systems (G.P.S.'s) and more particularly to a programmable waveform generator therefore.

BACKGROUND OF INVENTION

As is well known in the art, the Global Positioning System (G.P.S.) includes 24 satellites orbiting the Earth in six orbit planes, each being inclined with respect to equatorial plane by 55° and longitudinally offset from each other by 60°. It should be recognized that the present method is equally applicable for other positioning systems as well, such as GLONASS for example, wherein 24 satellites (21 operational and 3 spares) are inclined at 65° angles and offset by 120°.

In G.P.S. each satellite broadcasts carrier signals on the same frequencies. Navigational data is spread by a clear acquisition (C/A) code and modulated on the L1 (1575.42 MHZ) in-phase channel. The navigational data is further spread by a P(Y) code and modulated on both the L1 quadrature and L2 (1227.60 MHZ) in-phase channels.

As is well known in the art, by measuring delay in the signals transmitted from several of these satellites, it is possible to triangulate ones position and further to correct for ionospheric induced, tropospheric induced and ephemeral/clock based errors, for example.

As both military and civilian requirements for G.P.S. rapidly change, a condition which will likely continue well into the 21st century, operational modifications will become increasingly necessary. In fact, requirements for the G.P.S. system have changed since the contract for the next generation satellites (Block IIF) was awarded. Many of these changing requirements revolve around the waveform structure and the desire to evolve it.

The lead time from award of contract to delivery (often 5–7 years) and from delivery to launch (often an additional 5–7 years) and then to eventual obsolescence (often greater than an additional 7.5 years) is such that once a signal structure is selected for a new block of satellites, to satisfy a current set of requirements, the navigation community is locked into that signal structure for several decades. Accordingly, there is a need for a flexible waveform generator aboard the G.P.S. satellites that can be reprogrammed in orbit, to facilitate continued evolution of the navigation system to meet changing operational requirements.

Figure 1:
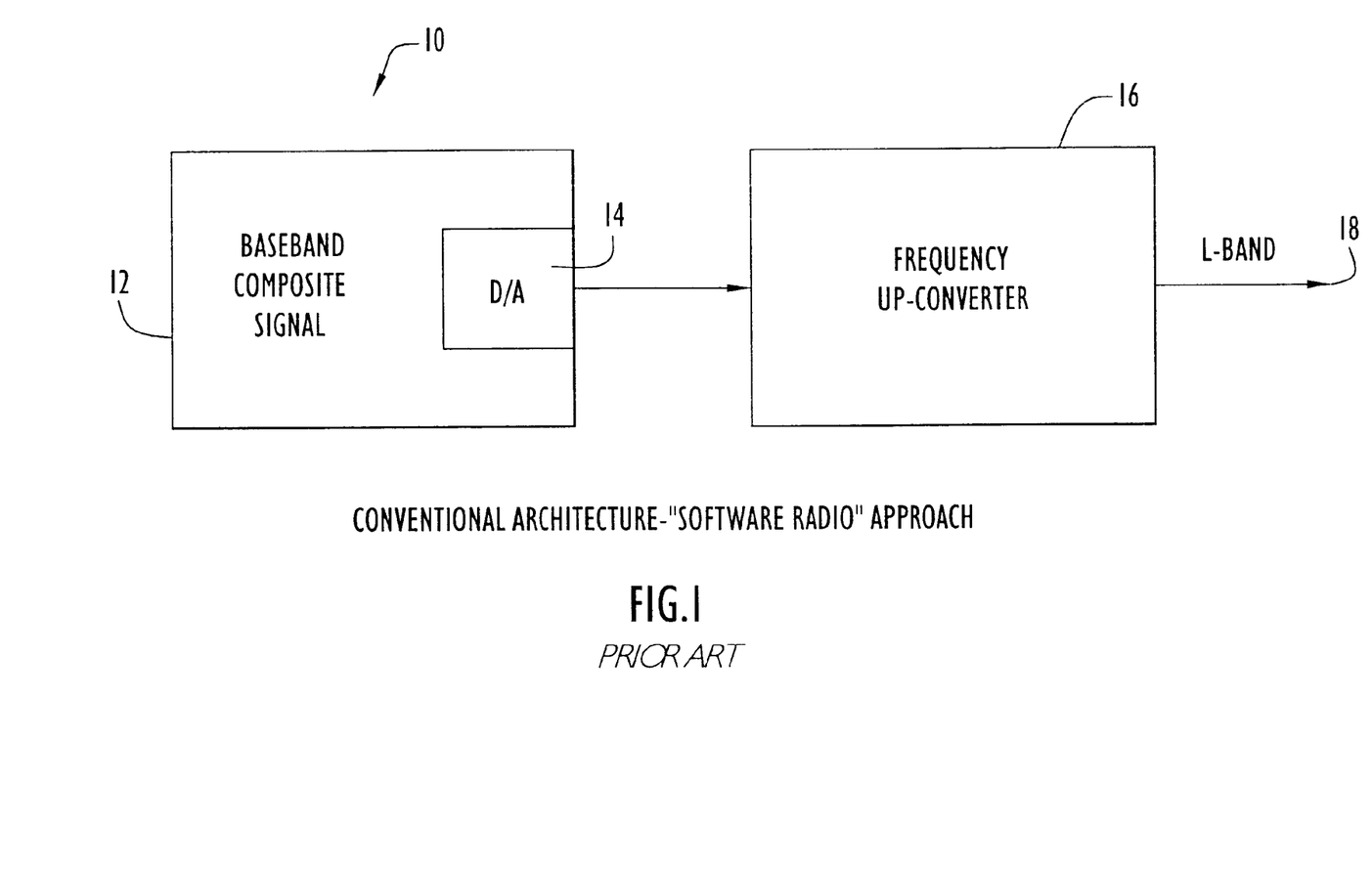
FIG. 1 illustrates a conventional software radio approach.

Conventional waveform generator architectures, wherein the entire composite signaling waveform is generated at baseband and then upconverted to the broadcast radio frequency (Rf), have been utilized in various types of communications systems (i.e. software radios) (See FIG. 1).

Although such an architecture can generally be used for communications systems, such an approach is not suitable for broadcast of the G.P.S. navigation signals from space. One limitation is the availability of space-qualified components that are fast enough to perform the required processing. This limitation results in an intermediate frequency that is too low to preclude harmonic interference in the resultant modulated signal. Another limitation is that any time jitter on the D/A converter results in additional phase noise on the composite output signal, which can violate the very stringent G.P.S. requirements. A third limitation is that bandpass filters are required for every mixer stage in the upconverter. When phase modulated signals are passed through these filters, they generate amplitude variations ("ringing") at every phase transition. These amplitude variations are problematic regarding satellite efficiency. Applying non-constant envelope signals to saturated amplifiers results in signal distortions that can impact navigation accuracy.

Of course, the use of saturated amplifiers on satellites is desirable due to the increased efficiency characteristics thereof.

Referring now to FIG. 1, therein is illustrated a conventional waveform generator 10 using the software radio method. Therein, a baseband composite signal is generated 12 and converted to an analog signal using digital to analog converters 14. The frequency of the analog signal is then up-converted to the desired L-band 18. As set forth though, due to the speed capabilities of current space qualified components (FPGA's and D/A's for example), interference can be caused by mixer harmonics when the first If frequency is too low in relation to signal bandwidth. Further, ringing of the bandpass filters in the mixer stages can also result in a non-constant envelope which results in further errors and reduced amplifier efficiency.

Figure 3:
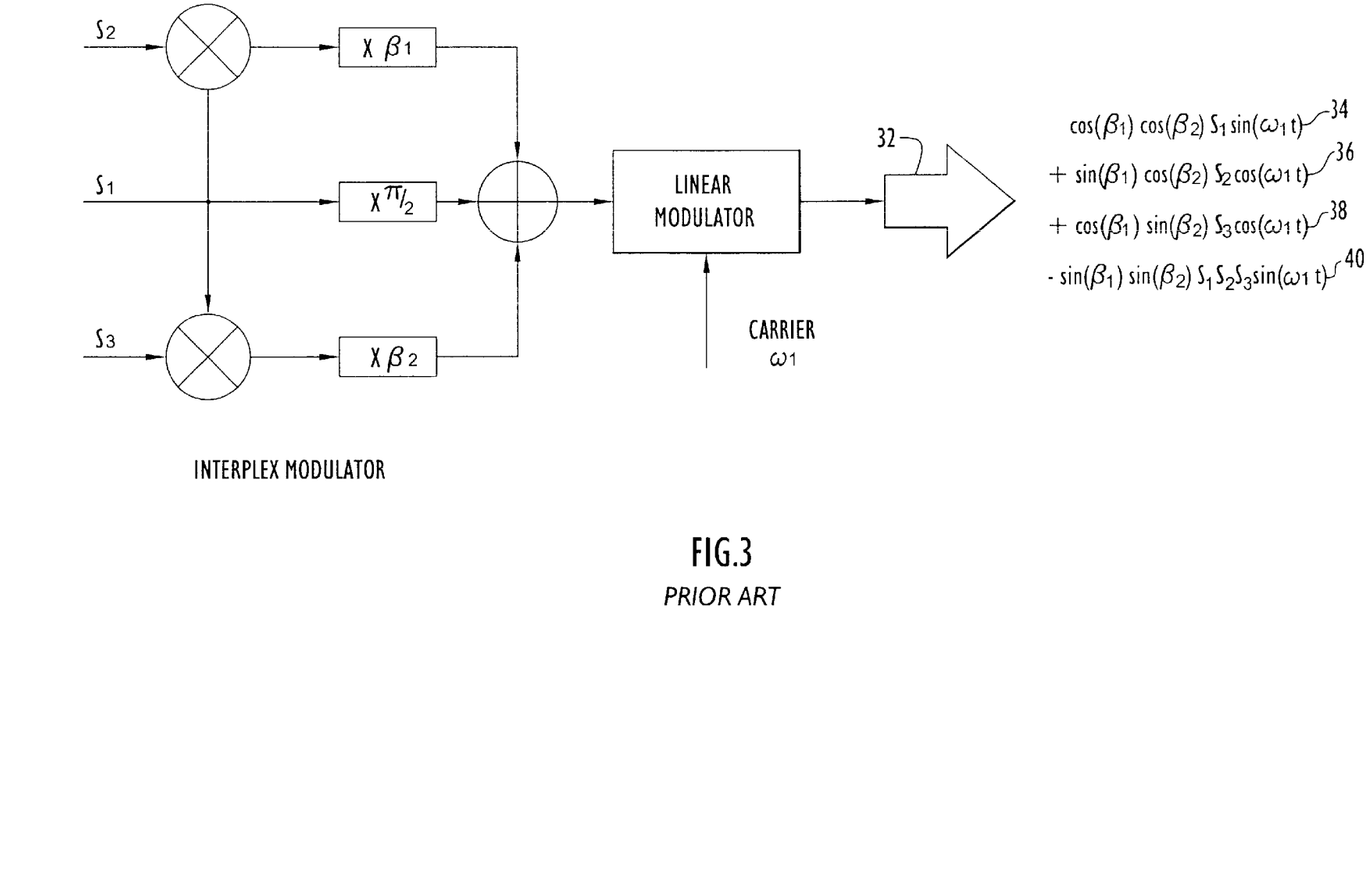
FIG. 3 illustrates an interplex modulation method.

One of the requirements that has changed since the awarding of the G.P.S. Block IIF contract is the need for an additional military signal on the same L Band carrier as the C/A and P(Y) signals. Although several techniques are presently under consideration for combining the 3 signals, such as majority voting and hard limiting, the present invention utilizes the Interplex Modulation technique. Interplex Modulation is a very efficient technique for combining three or more signals to generate a constant envelope composite signal with minimal combining losses. FIG. 3 illustrates the conventional method for implementing Interplex Modulation and, as depicted therein, it requires the use of a linear modulator. A constant envelope composite signal is highly desirable so that a highly efficient saturated power amplifier can be utilized.

Figure 2:
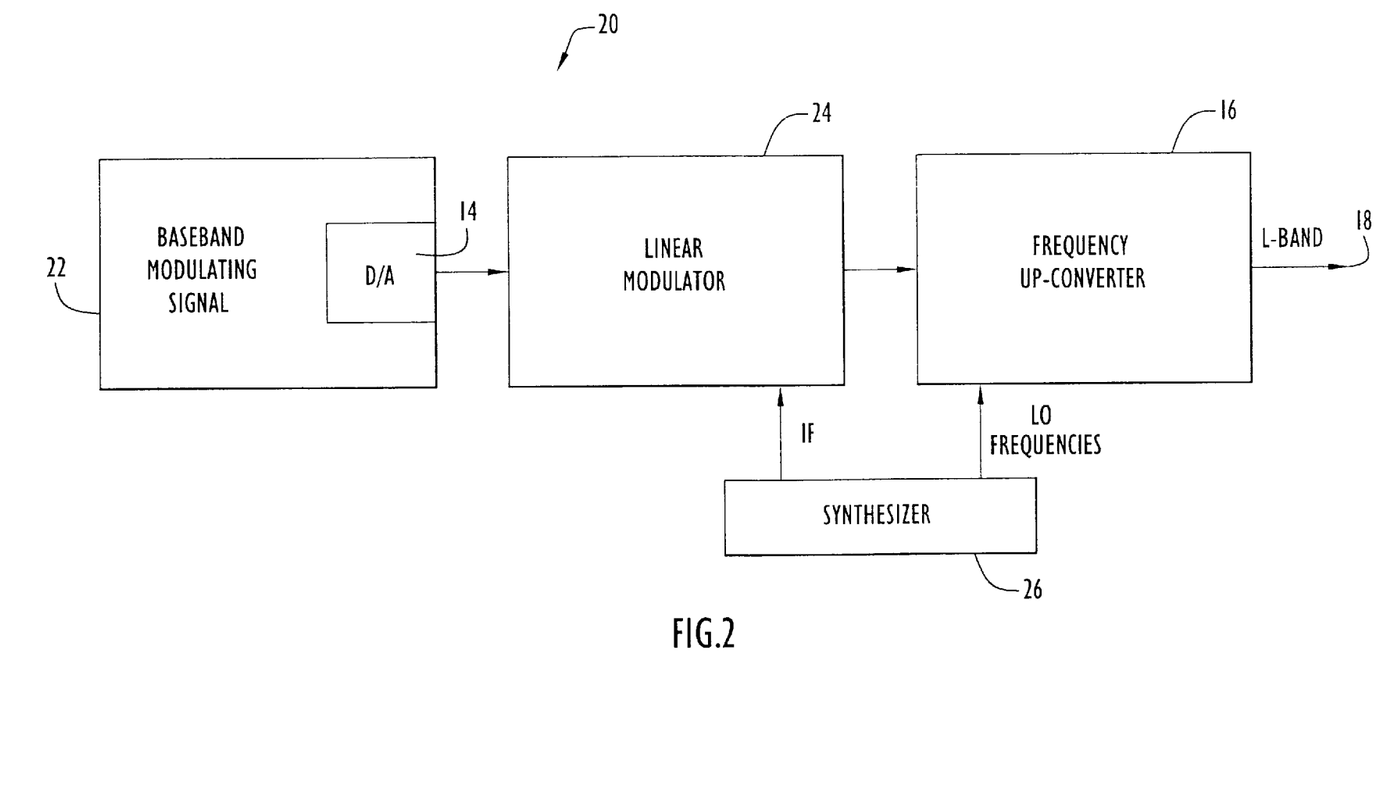
FIG. 2 illustrates a modified software radio approach.

Referring now to FIG. 2, an alternative approach 20 would be to relocate the digital-to-analog interface 14 as illustrated therein. The first step would be to generate a baseband modulating signal 22 and convert that from digital to analog format 14. By converting at this step, a lower speed digital-to-analog converter 14 can be utilized because the modulating signal has less bandwidth than the composite signal. The analog signal would then be fed into a linear modulator 24 wherein it modulates the If frequency from a synthesizer 26 and up-converted 16 thereafter.

However, as will be evident to one skilled in the art, such an approach could still lead to ringing of the bandpass filters in the frequency up-converter 15 which in turn represents a significant risk in the development, certification and space use of such a linear modulator. Accordingly, not all of mentioned drawbacks would be overcome by such a system and method. Therefore, it is also desirable to avoid the inclusion of linear modulators.

Figure 4:
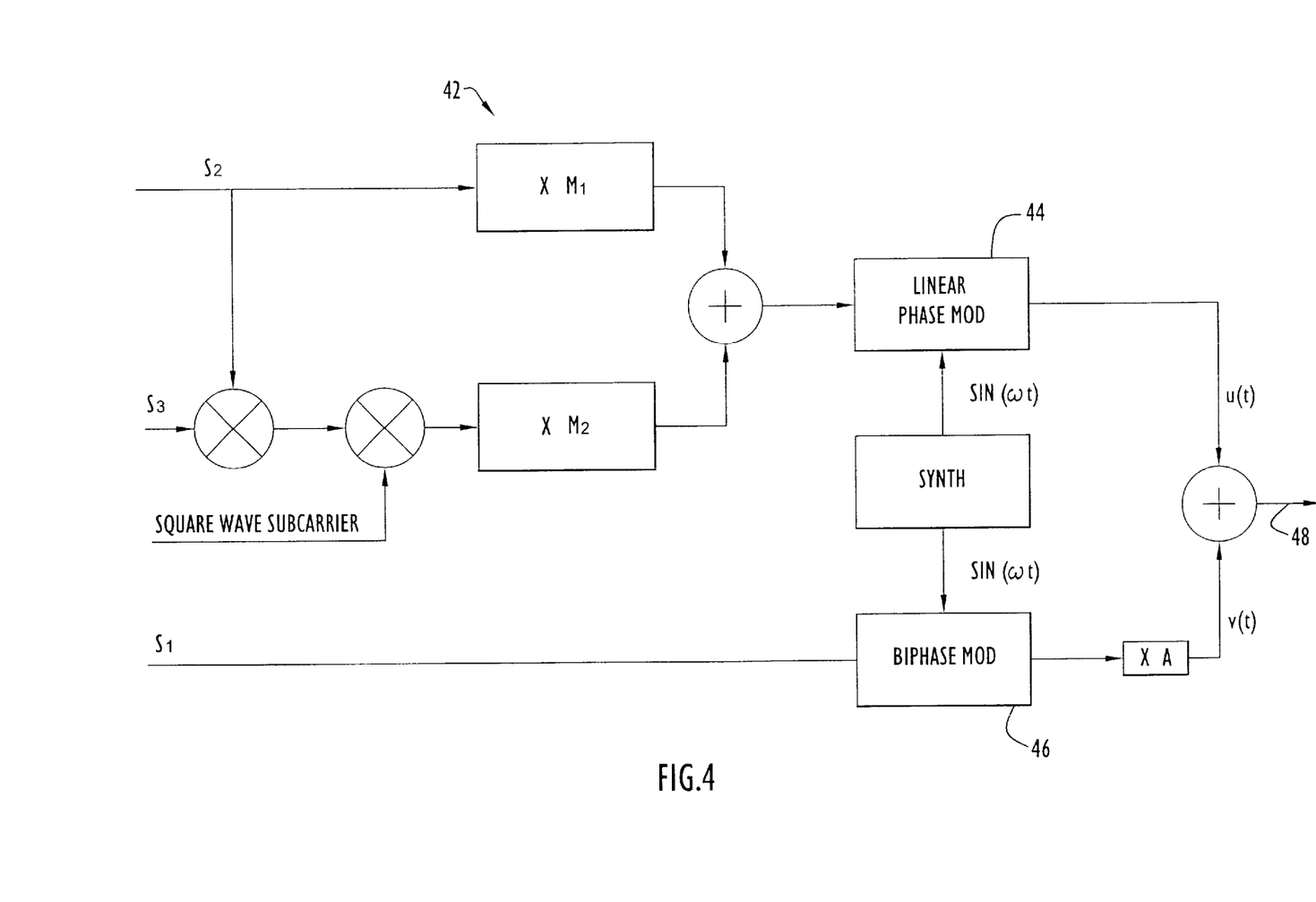
FIGS. 4–7 illustrate alternative interplex modulation method.

FIG. 4 illustrates an interplex modulation technique 42 utilizing a combination of linear 44 and biphase 46 modulators. The output of this modulator 42 is able to produce a signal 48, however, no IM term is generated. Accordingly, the envelope of the output signal 48 is not constant and hence undesirable.

Figure 5:
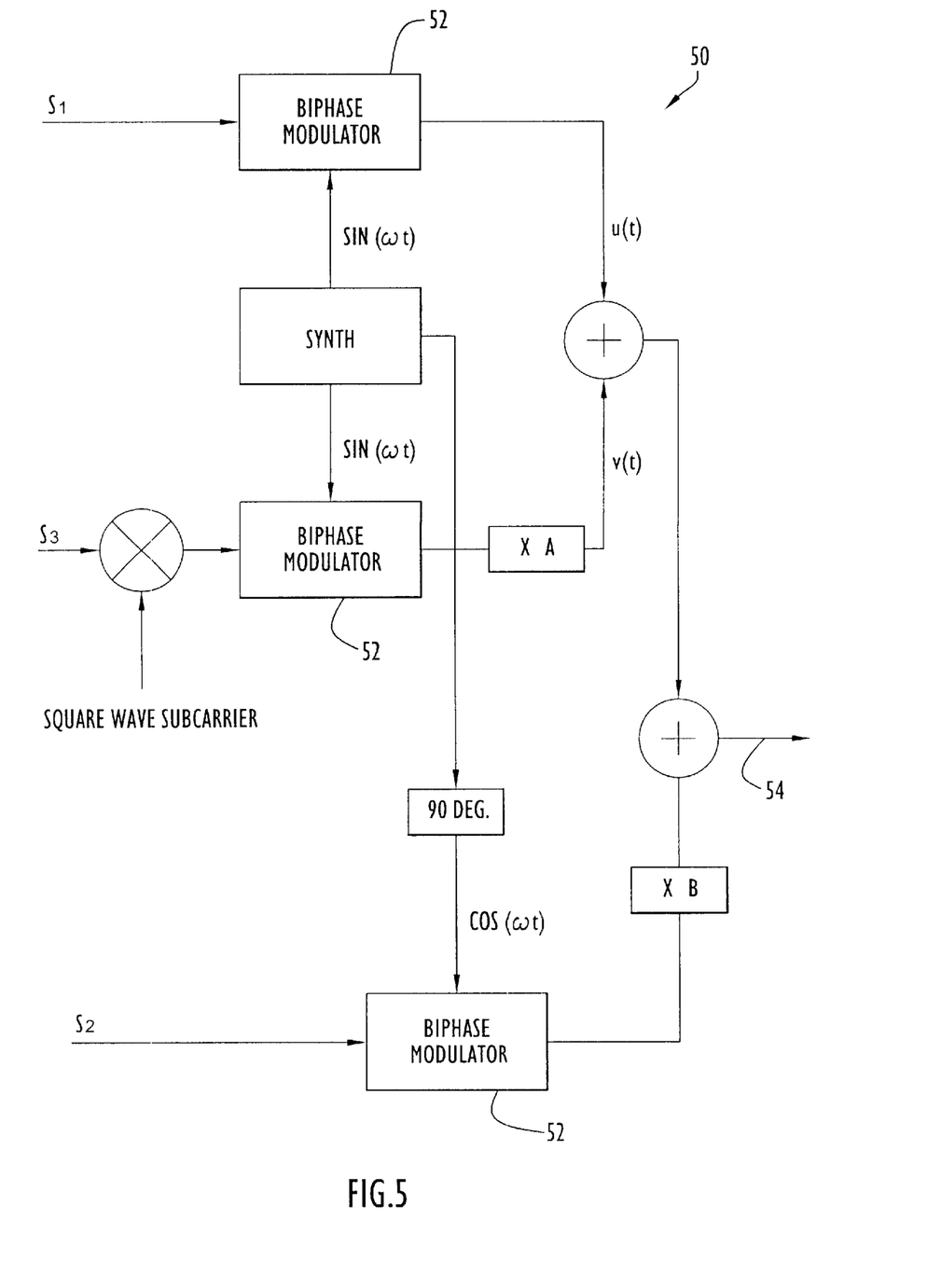

Referring now to FIG. 5, therein is illustrated a second interplex modulation technique 50 utilizing only biphase modulators 52. Again though, as illustrated for FIG. 4, the envelope of the resultant output signal 54 again is not sufficiently constant.

Figure 6:
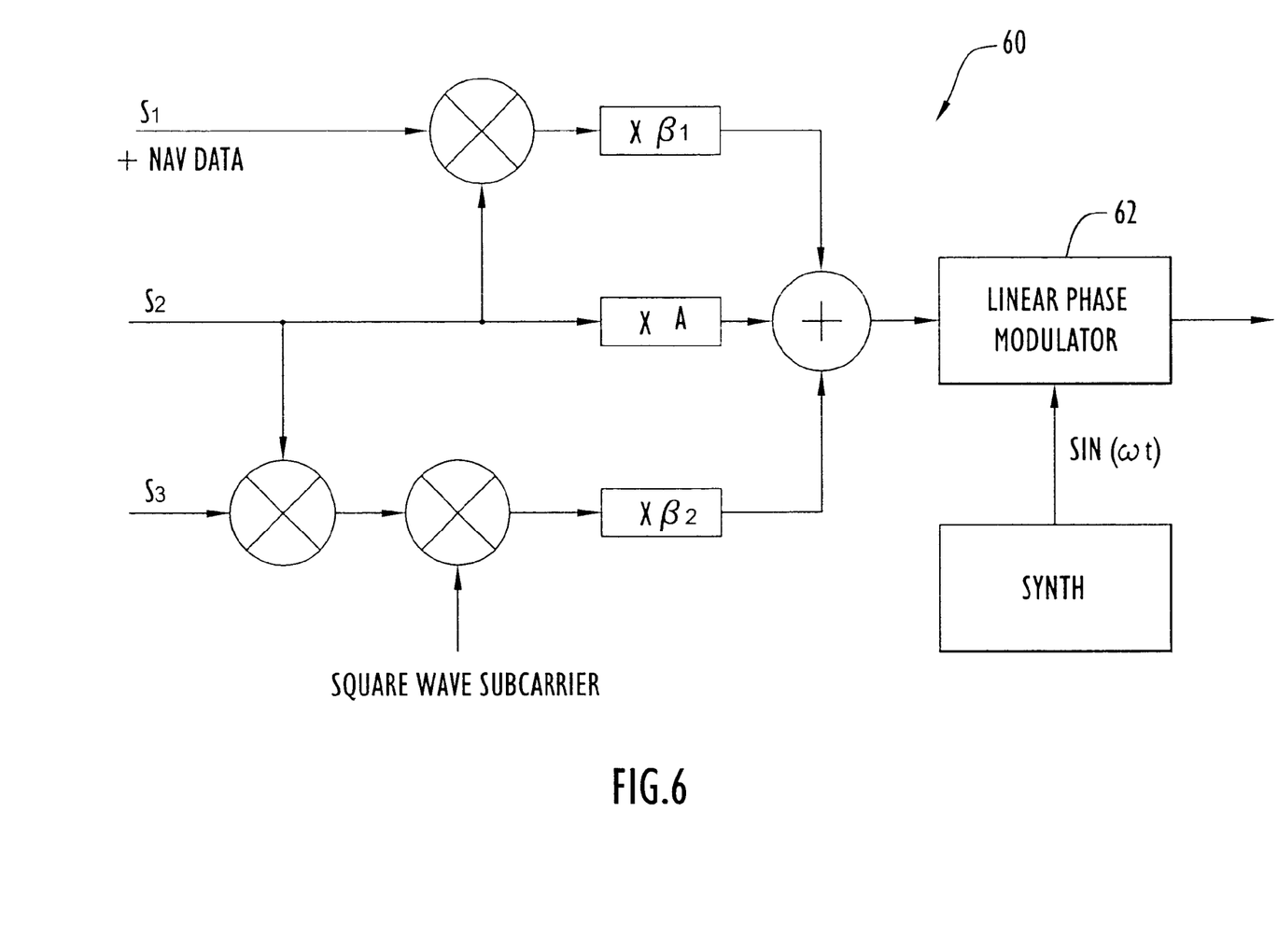

Referring now to FIG. 6, therein is illustrated a third interplex modulation technique 60 with a linear phase modulator 62 with the S3 channel in phase with S1 channel. However, as illustrated therein, a linear phase modulator 62 is required, therefore, such a configuration fails to remedy all of the aforementioned shortcomings.

Figure 7:
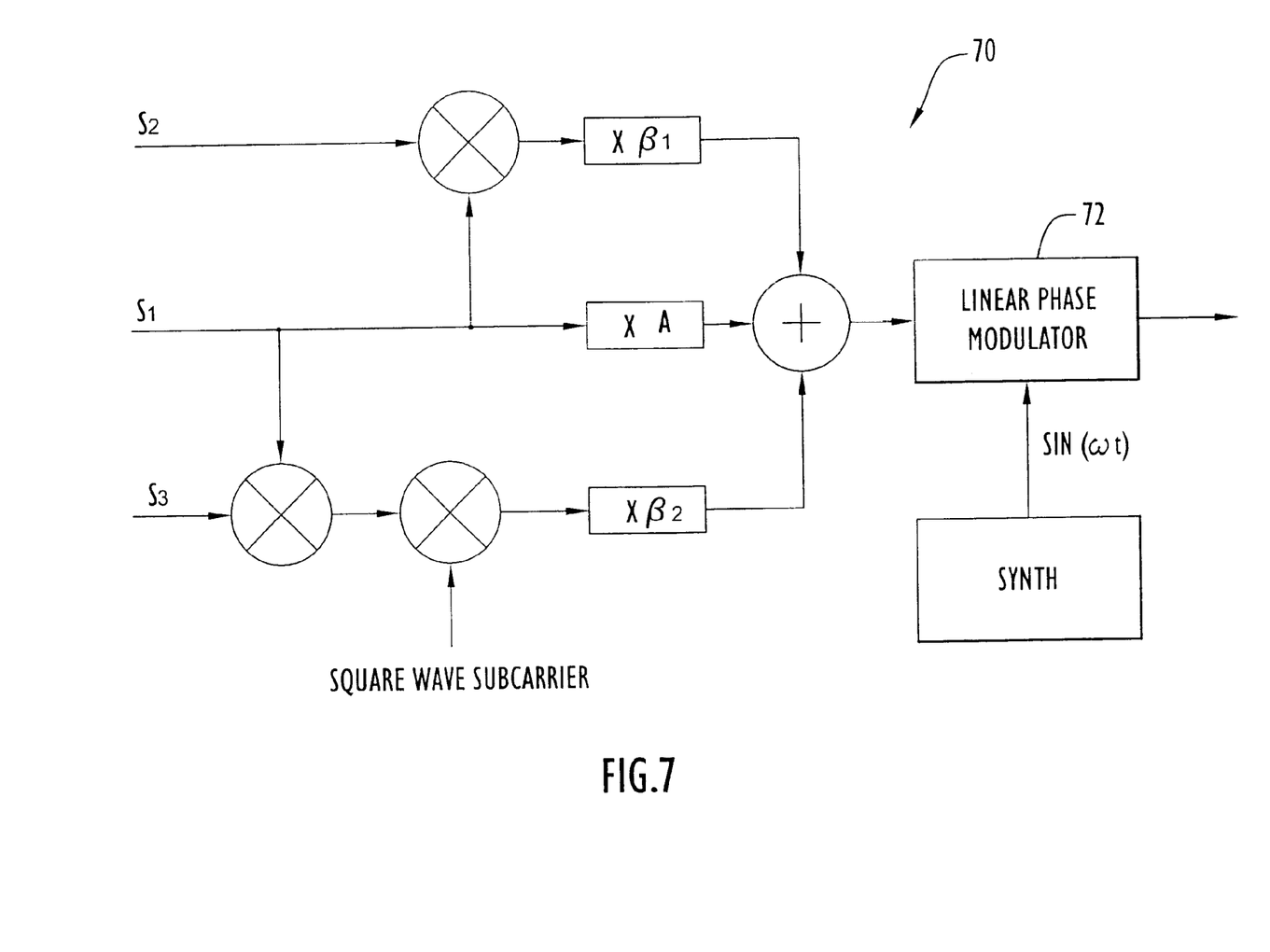

Finally, referring to FIG. 7, therein is illustrated a fourth interplex modulation technique 70 utilizing a linear phase modulator 72 with the S3 channel in phase with the S2 channel. Again though, please note the inclusion of a linear phase modulator 72, as illustrated for FIG. 6.

Accordingly, each of these interplex modulation techniques (40, 42, 50, 60, 70) fails to remedy all of the aforementioned shortcomings of the prior art and hence satisfy each of the objects of the present invention.

SUMMARY OF INVENTION

A method for generating a global positioning signal from a space based craft including the steps of generating a plurality of binary modulating signals using a waveform generator; separately modulating an in-phase component of a desired carrier of the global positioning signal to be generated with at least a first binary, modulating signal selected from the plurality to generate at least one corresponding in-phase modulated signal component; separately modulating a quadrature component of the carrier with at least a second binary modulating signal selected from the plurality to generate at least one corresponding quadrature modulated signal component; and, combining the at least one in-phase modulated signal component and the at least one quadrature modulated signal component to generate the global positioning signal; wherein the global positioning signal has a constant envelope.

DETAILED DESCRIPTION OF INVENTION

The present invention utilizes a unique architecture wherein modulating signals are generated using a waveform generator and are then used to directly modulate an L-Band Rf carrier. This approach eliminates all of the limitations of these previous approaches. The modulating signal has a much lower frequency content than the modulated If signal, and the processing required to generate the modulating signal is well within the capabilities of space-qualified processors readily available today. In this new architecture, the modulating signals from the waveform generator are clocked binary signals that are sent directly to the modulators, thereby eliminating the D/A converter and any associated jitter and phase noise. Further, because there is no upconversion of the modulated signal required, there is no amplitude variation introduced by bandpass filters.

The operation of this invention depends upon the interplex modulation technique, which has been documented, for example in Ananda, M., P. Munjal, B. Siegel, R. Sung and K. T. Woo, "Proposed GPS Integrity and Navigation Payload on DSCS (U)", 1993 IEEE Military Communications Conference, Boston, Mass., October, 1993, the disclosure of which is hereby incorporated by reference.

Referring now to FIG. 3, therein is illustrated a standard interplex modulation approach 30 for three signals, S1, S2 and S3. Interplex modulation allows combining of multiple signals into a phase modulated composite signal that maintains a constant envelope, thereby allowing the use of saturated power amplifiers without signal distortion. For the case of these three component signals S1, S2 and S3, the interplex modulator 30 generates a composite signal 32 that includes the three desired components (34, 36, 38) plus an unwanted intermodulation product (40). These products as illustrated in FIG. 3 are:

$$\cos(\beta 1) \cos(\beta 2) \text{ s1 } \sin(\omega 1 t), \quad (34)$$

$$+\sin(\beta 1) \cos(\beta 2) \text{ s2 } \cos(\omega 1 t) \quad (36)$$

$$+\cos(\beta 1) \sin(\beta 2) \text{ s3 } \cos(\omega 1 t) \quad (38)$$

$$-\sin(\beta 1) \sin(\beta 2) \text{ s1 s2 s3 } \sin(\omega 1 t). \quad (40)$$

The first three terms correspond to the desired signal terms S1, S2 and S3 respectively; the fourth term (40) is an intermodulation (IM) product, which is an undesired term generated by the modulator. Further, the resulting modulator output signal 32 has a constant envelope, thus, a saturated amplifier can be used to transmit this signal on the satellite without backoff. In other words, although the intermodulation product consumes some of the available power, it serves to keep the amplitude of the composite signal envelope constant, which in turn facilitates the use of saturated amplifiers.

Figure 8:
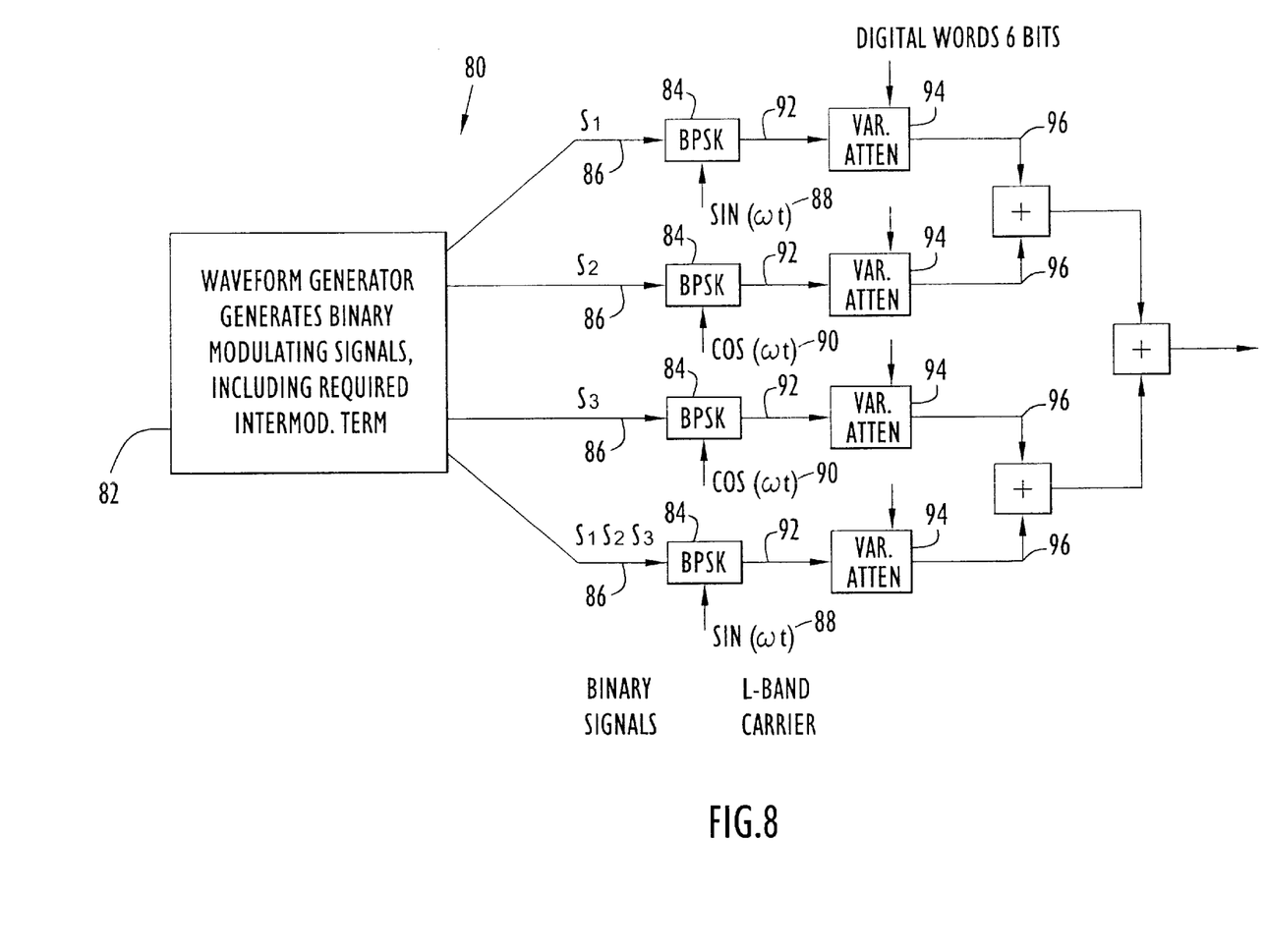
FIG. 8 illustrates the method according to the present invention.

This invention incorporates a unique implementation of an interplex modulator 80, wherein the three signal components (S1, S2, S3) and the required intermodulation product (IM) are all generated individually in the waveform generator 82 and are sent to the modulators as binary signals 86 (See FIG. 8). Each of these binary signals 86 is fed to a BPSK modulator 84 which modulates either the in-phase 88 or quadrature phase 90 component of the desired L-Band carrier (i.e. L1 or L2). The outputs 92 of the BPSK modulators 84 are scaled, using variable attenuators 94, to achieve the desired relative power ratios between the various signal components 96.

Reprogrammability of the waveform generator 82 allows modification of all of the critical signaling parameters, such as chipping rates, code types, fixed carrier offset, hopping sequence for hopped carrier offset, and relative power ratios.

Figure 9:
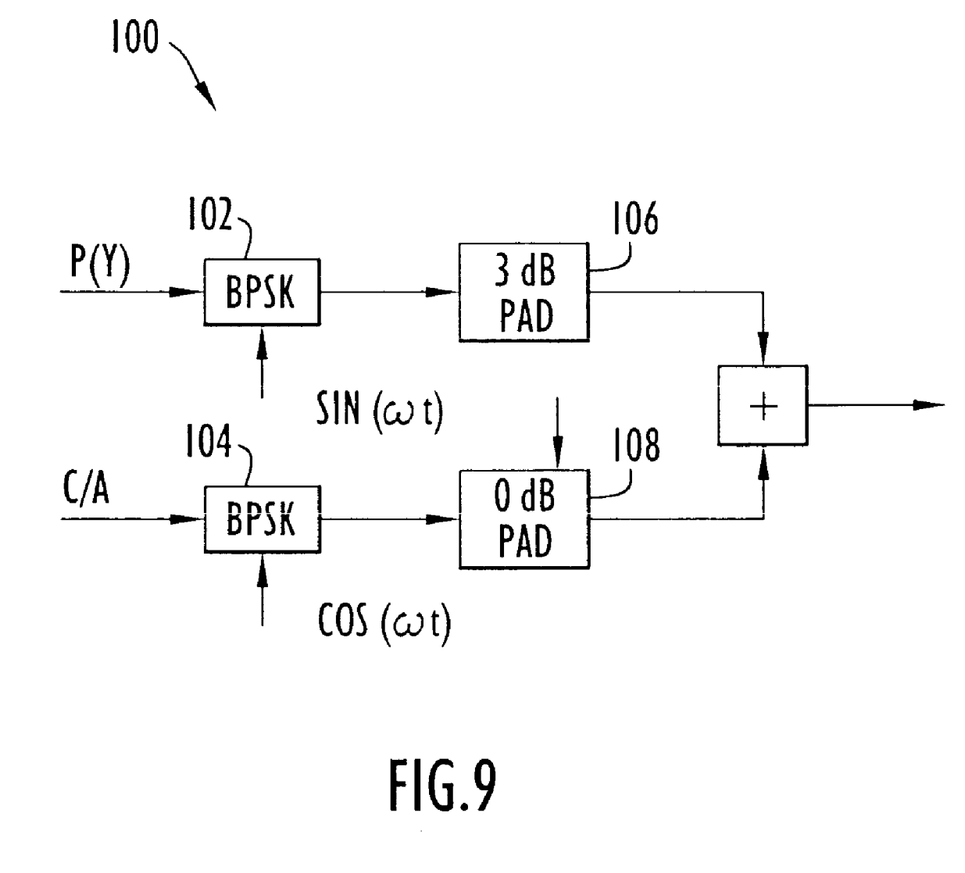
FIG. 9 illustrates present G.P.S. IIR implementation of the P(Y) and CA codes.

Referring now also to FIG. 9, therein is illustrated current G.P.S. IIR implementation 100 of the P(Y) and C/A codes. Therein, the P(Y) code is implemented via a BPSK modulator 102 with sin(ωt) and the C/A code is implemented via a second BPSK modulator 104 with cos(ωt). Appropriate pads (106, 108) are included in both the P(Y) and C/A signal paths to effect the correct power ratio. The signals are finally mixed together to form the desired signal. Accordingly implementation of a preferred form of the present invention, as illustrated in FIG. 8, can be accomplished using currently available space certified equipment.

More particularly, preferably the waveform generator 82 generates binary modulating signals (S1, S2 and S3) including the intermodulation term (S1 S2 S3) as has been discussed. The first signal S1 is fed to a BPSK modulator 84 substantially identical to that of FIG. 9 along with sin(ωt). The second signal S2 is fed to a BPSK modulator substantially identical to that of FIG. 9 along with cos(ωt). The third signal S3 is fed to a BPSK modulator 84 substantially identical to that of FIG. 9 along with cos(ωt). And, the fourth signal S1 S2 S3 is fed to a BPSK modulator 84 substantially identical to that of FIG. 9 along with sin(ωt). Accordingly, the three signals (S1, S2 and S3) and intermodulation signal (s1 s2 s3) modulate the L-band carrier desired. Each of these modulated signals can be variably attenuated to the desired level prior to mixing to form the final signal to be transmitted using variable attenuator 94. Accordingly, all of the prior art problems heretofore discussed can be overcome.

Figure 10:
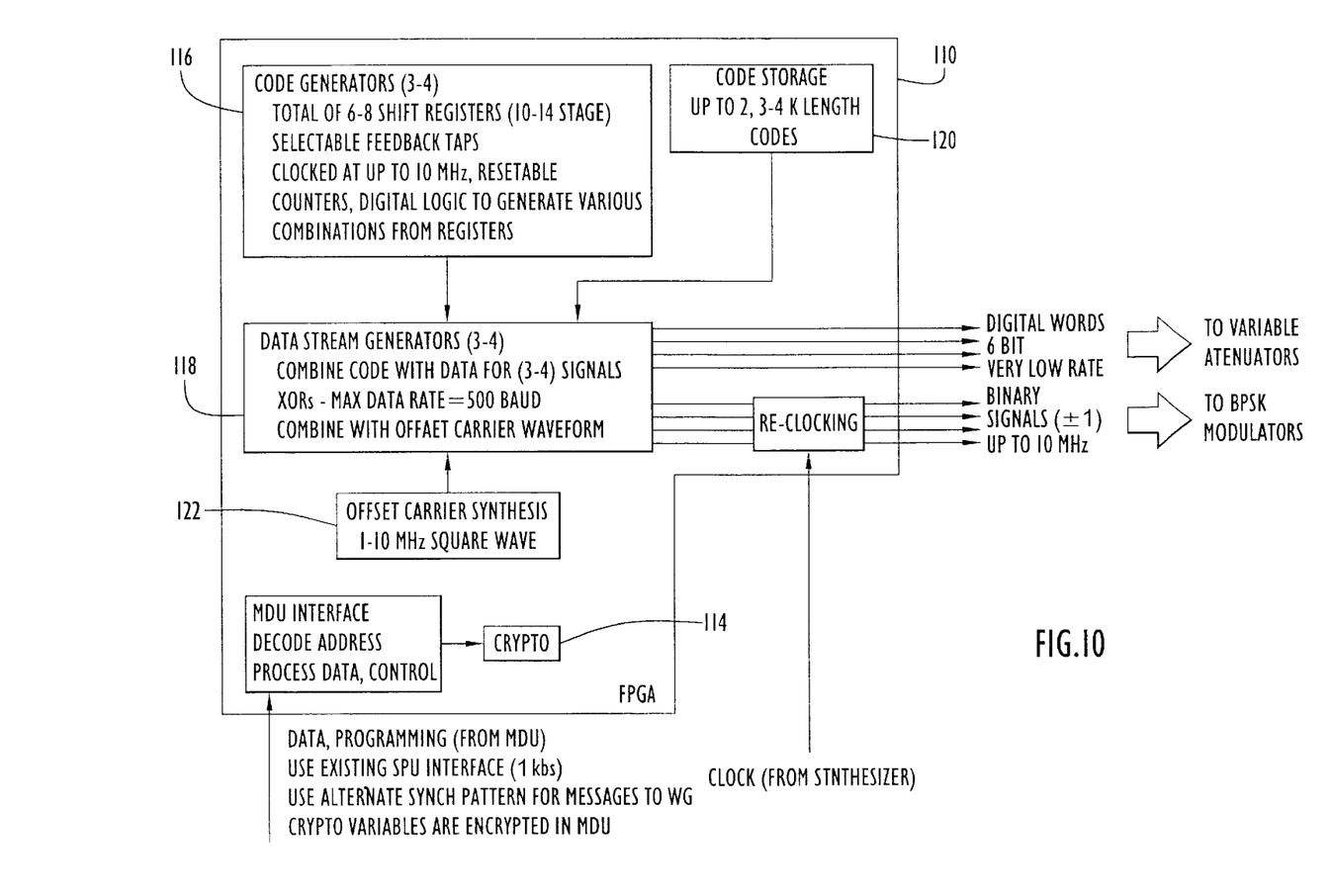
FIG. 10 illustrates a preferred embodiment of the implementation of the present invention.

Referring now to FIG. 10, in a preferred embodiment, implementation of this method includes a Field Programmable Gate Array (FPGA) 110 which receives data and programming instructions from the existing MDU 112. Alternatively this invention can be implemented utilizing an Application Specific Integrated Circuit (ASIC). Preferably the FPGA 110 further includes a cryptography device 114 (See FIG. 11 also) to enable encrypted communication therewith and encryption of the signals transmitted therefrom. In this FPGA 110, code generators (3–4) 116 are used to generate various codes to be combined with various data streams. The code generator 116 preferably includes of a total of 6–8 shift registers (10–14 stage), selectable feedback taps and can be clocked up to 10 MHZ. Further a code storage device 120 provides up to two 3–4 K length codes which can be used for codes that cannot be generated with shift registers.

The data stream generators 118 (3–4) combine code with data for 3–4 signals some of which can eventually be combined with the offset carrier provided by synthesis 122. The FPGA 110 thus provides 6 bit digital words at a very low rate to the variable attenuators 94 and binary signals (±1) up to 10 MHZ to the BPSK modulators 84.

Figure 11:
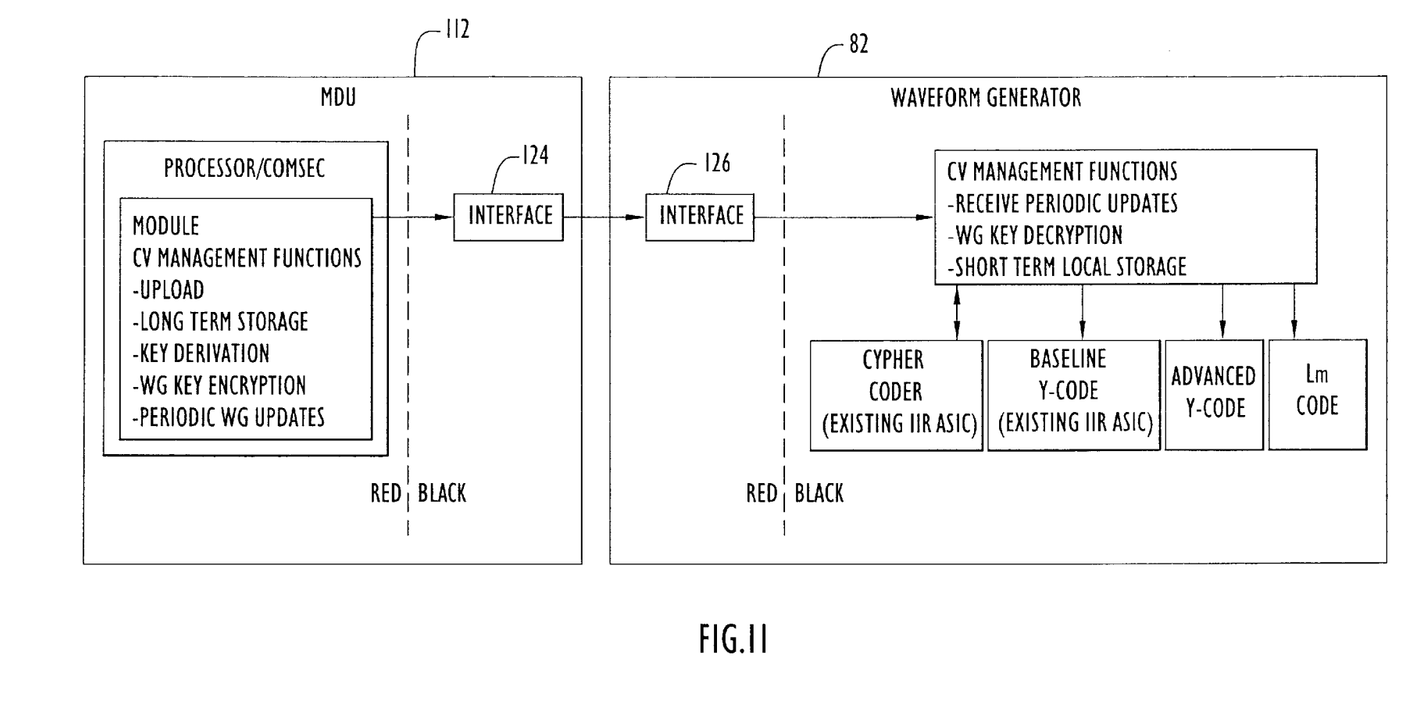
FIG. 11 illustrates the preferred embodiment of FIG. 10 adapted to be interfaced with conventional G.P.S. satellites.

FIG. 11 illustrates the preferred embodiment of FIG. 10 adapted to the specific application of retrofitting the existing G.P.S. Block IIR satellites, wherein a processor already exists in the Mission Data Unit (MDU). The interface 124 of the MDU 112 and interface 126 of the waveform generator 82 cooperate to seamlessly integrate the MDU 112 and waveform generator 82 into a single functional unit. The MDU will continue to provide CV management functions such as uploading, long-term storage, key derivation, WG key encryption and periodic WG updates. The waveform generator will assume the responsibility for receiving periodic updates, WG key decryption and short-term local storage including the use of cipher codes, baseline Y coders, advance Y coders and LM coders.

Figure 12:
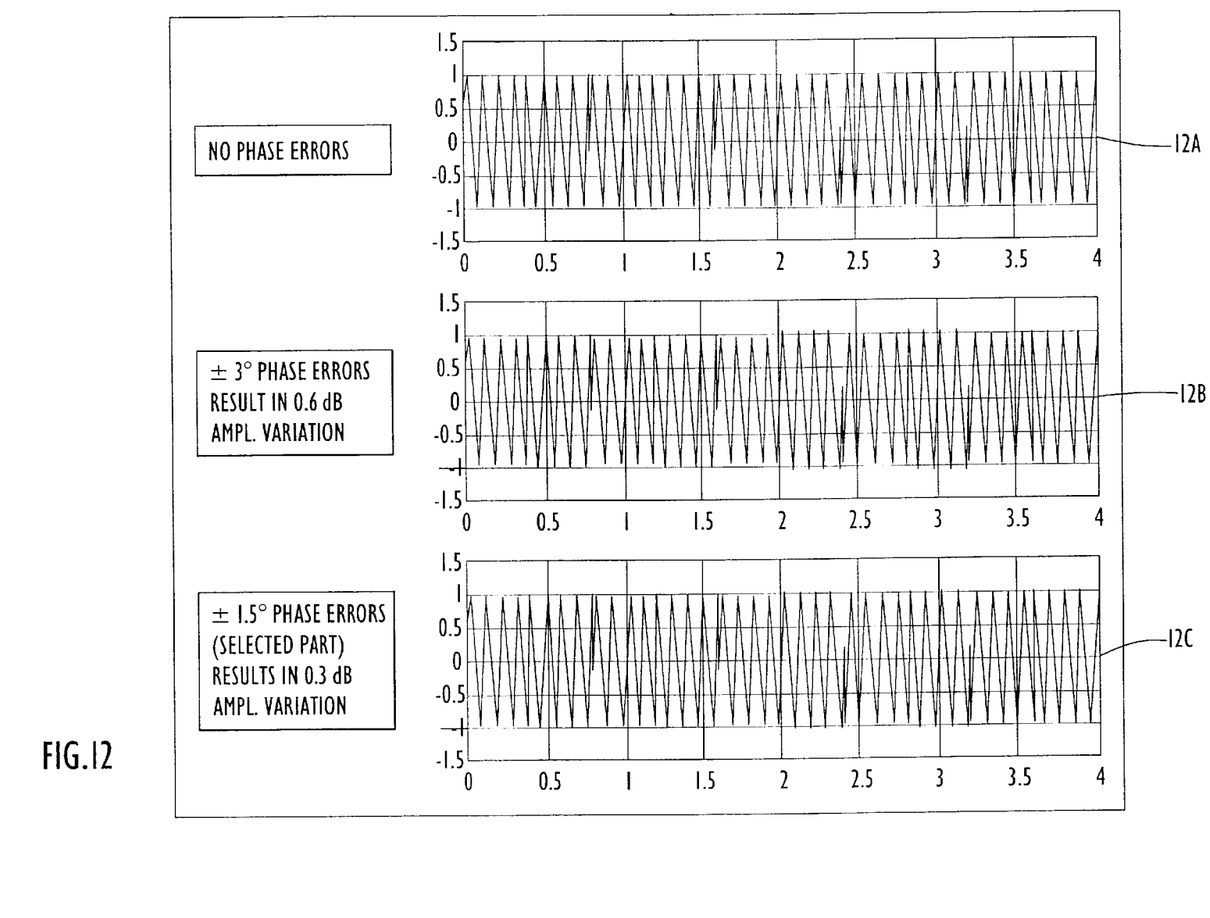
FIG. 12 illustrates the amplitude variations in the composite signals resultant from the phase mismatch and the variable attenuators.

Referring now to FIG. 12, therein is illustrated amplitude variations in the composite signal resultant from the phase mismatch in the variable attenuators. Waveform 12A illustrates the envelope with no phase errors induced, waveform 12B illustrates the envelope with ±3° phase errors induced (resulting in a 0.6 dB amplitude variation), and waveform 12C illustrates the envelope with ±1.5° phase errors induced (resulting in a 0.3 dB amplitude variation). When comparing these results to typical specifications (such as ICD-200) 100 mrad of phase noise is acceptable, however the present invention results in only ≈30 mrad, which is well within specified limitations. Additionally, because modulation is performed in the same way as on the IIR, synthesizer contribution is the same. Further, because the binary signals from the FPGA are reclocked with the MDU reference just before output, they have the same signal quality as current modulation techniques from the MDU. Also, measured AM to PM distortion for IIR HPA's ≈4°/dB, resulting in 1.2° (21 mrad) for the selected attenuator ports. Therefore, the total expected phase noise=RSS of 30 mrad and 21 mrad=37 mrad, which is well within acceptable limits.

One should also recognize correlation loss, specified out around 0.6 dB, using the present invention is 0.1 dB. Further, contribution due to attenuator phase mismatch, when supplying a centered C/A code and P(Y) code, as is currently the case on IIR L1, is <0.1 dB. Therefore, the total expect correlation loss attributable to the present system is <0.2 dB, which is well within the 0.6 dB limit specified.

Finally, one should also be aware that no additional group delay uncertainty, differential group delay, resultant user range error, or spurious transmissions are expected to result over current methods.

Having described the current embodiment of this invention, it is evident that other embodiments incorporating these concepts may be used. Accordingly, although the invention has been described and pictured in a preferred form with a certain degree of particularity, it is understood that the present disclosure of the preferred form has been made only by way of example and that numerous changes in the detail of construction in combination and arrangement of parts may be made without departing from the spirit and scope of the invention as here and after claimed. It is intended that the patent shall cover by suitable expression in the appended claims, the whatever features of patentable novelty exist in the invention disclosed.

We claim:

1. A method for generating a global positioning signal from a space based craft comprising:
    (a) generating a plurality of binary modulating signals using a waveform generator;
    (b) separately modulating an in-phase component of a desired carrier of said global positioning signal to be generated with at least a first binary modulating signal selected from said plurality of binary modulating signals to generate at least one corresponding in-phase modulated signal component;
    (c) separately modulating a quadrature component of said carrier with at least a second binary, modulating signal selected from said plurality of binary modulating signals to generate at least one corresponding quadrature modulated signal component; and
    (d) combining said at least one in-phase modulated signal component and said at least one quadrature modulated signal component to generate said global positioning signal;
    wherein said global positioning signal has a constant envelope.

2. The method of claim 1, further comprising:
    (e) separately modulating said in-phase component of said carrier with at least a third binary, modulating signal selected from said plurality of binary modulating signals to generate an additional corresponding in-phase modulated signal component;
    wherein (d) includes combining both of said in-phase modulated signal components and said at least one quadrature modulated signal component to generate said global positioning signal.

3. The method of claim 1, further comprising:
    (e) separately modulating said quadrature component of said carrier with at least a third binary, modulating signal selected from said plurality of binary modulating signals to generate an additional corresponding quadrature modulated signal component;

wherein (d) includes combining both of said quadrature modulated signal components and said at least one in-phase modulated signal component to generate said global positioning signal.

4. The method of claim 1, further comprising:

(e) separately modulating said in-phase component of said carrier with at least a third binary, modulating signal selected from said plurality of binary modulating signals to generate an additional corresponding in-phase modulated signal component;

(f) separately modulating said quadrature component of said carrier with at least a fourth binary, modulating signal selected from said plurality of binary modulating signals to generate an additional corresponding quadrature modulated signal component;

wherein (d) includes combining both of said in-phase modulated signal components and both of said quadrature modulated signal components to generate said global positioning signal.

5. The method of claim 1, wherein a select number of said binary modulating signals are each respectively indicative of a unique code.

6. The method of claim 5, wherein at least one of said binary modulating signals is not indicative of a unique code.

7. The method of claim 6, further comprising the step of reprogramming said waveform generator when said unique codes change.

8. The method of claim 1, further comprising the step of attenuating each of said in-phase and quadrature modulated components to predetermined respective levels prior to combining them.

9. The method of claim 1, wherein:

a unique code associated with one of said plurality of binary modulation signals is a clear acquisition code; and a unique code associated with another of said plurality of binary modulation signals is an encrypted code.

10. A device for generating a global positioning signal from a space based craft comprising:

a reprogrammable waveform generator adapted to generate a plurality of binary modulating signals;

modulating means for modulating an in-phase component of a desired carrier with at least one binary modulating signal selected from said plurality of binary modulating signals;

modulating means for modulating a quadrature component of the desired carrier with at least one binary modulating signal selected from said plurality of binary modulating signals; and mixer means for combining said in-phase and quadrature components to generate a global positioning signal having a constant envelope.

11. The device of claim 10, further comprising means for reprogramming said waveform generator.

12. The device of claim 10, wherein a select number of said binary modulating signals are each indicative of a respective unique code.

13. The device of claim 12, wherein at least one of said binary modulating signals is not indicative of a unique code.

14. A method for providing a global positioning signal comprising the steps of:

separately generating a plurality of binary modulating signals;

separately generating an intermodulating signal dependent upon said plurality of binary modulating signals;

modulating a plurality of signals associated with a desired carrier with said plurality of binary modulating signals to generate a plurality of modulated signals;

modulating an additional signal associated with said desired carrier with said intermodulating signal to generate an intermodulated signal; and, mixing said plurality modulated signals with said intermodulated signal to generate a global positioning signal.

15. The method of claim 14, further comprising the step of attenuating each of said plurality of modulated signals and said intermodulated signal, respectively.

16. The method of claim 14, wherein said plurality of modulated signals and said intermodulated signal when mixed form a signal of substantially constant amplitude.

17. The method of claim 14, further comprising the step of utilizing a programmable waveform generator to generate each of said plurality of binary modulating signals.

18. The method of claim 17, further comprising the step of utilizing said programmable waveform generator to generate said intermodulating signal.

19. The method of claim 18, further comprising the step of reprogramming said programmable waveform generator to modify a parameter of said global positioning signal.

20. The method of claim 19, wherein said parameter is selected from the group consisting of: chipping rates, code types, fixed carrier offset and relative power ratios.

21. A method of generating a constant envelope composite signal, comprising:

(a) generating a plurality of modulating signals;

(b) using the modulating signals to separately modulate a plurality of component signals;

(c) scaling the component signals to establish a predetermined power ratio among the component signals; and (d) combining the component signals to form the constant envelope composite signal.

22. The method of claim 21, wherein the modulating signals are baseband signals.

23. The method of claim 21, wherein the component signals are in-phase and quadrature components of an RF carrier signal.

24. The method of claim 21, wherein the modulating signals contain global positioning information.

25. A method of generating a constant envelope composite signal, comprising:

(a) generating a plurality of modulating signals, wherein the plurality of modulating signals includes plural information signals and an intermodulation product signal that is a function of the plural information signals;

(b) using the modulating signals to separately modulate a plurality of component signals; and (c) combining the component signals to form the constant envelope composite signal.

26. The method of claim 21, wherein (b) includes modulating the component signals via phase shift keying.

27. An apparatus for generating a constant envelope composite signal, comprising:

a waveform generator configured to generate a plurality of modulating signals;

a plurality of modulators configured to respectively modulate a plurality of component signals in accordance with the modulating signals;

a plurality of signal scalers corresponding to the plurality of modulators, said signal scalers scaling the component signals to establish a predetermined power ratio among the component signals; and a signal combiner configured to combine the component signals to form the constant envelope composite signal.

28. The apparatus of claim 27, wherein said signal scalers are variable attenuators.

29. The apparatus of claim 27, wherein said modulators are binary phase shift keying modulators.

30. An apparatus for generating a constant envelope composite signal, comprising:

a waveform generator configured to generate a plurality of modulating signals, wherein said waveform generator is programmable to facilitate modification of signaling parameters;

a plurality of modulators configured to respectively modulate a plurality of component signals in accordance with the modulating signals; and a signal combiner configured to combine the component signals to form the constant envelope composite signal.

31. The apparatus of claim 27, wherein the modulating signals are baseband signals.

32. The apparatus of claim 27, wherein the component signals are in-phase and quadrature components of an RF carrier signal.

33. The apparatus of claim 27, wherein the modulating signals contain global positioning information.

34. An apparatus for generating a constant envelope composite signal, comprising:

a waveform generator configured to generate a plurality of modulating signals, wherein the plurality of modulating signals includes plural information signals and an intermodulation product signal that is a function of the plural information signals;

a plurality of modulators configured to respectively modulate a plurality of component signals in accordance with the modulating signals; and a signal combiner configured to combine the component signals to form the constant envelope composite signal.

35. An apparatus for generating a constant envelope composite signal, comprising:

means for generating a plurality of modulating signals;

means for separately modulating a plurality of component signals in accordance with the modulating signals;

means for scaling the component signals to establish a predetermined power ratio among the component signals; and means for combining the component signals to form the constant envelope composite signal.

36. The apparatus of claim 35, wherein said means for scaling are variable attenuators.

37. The apparatus of claim 35, wherein said means for modulating are binary phase shift keying modulators.

38. An apparatus for generating a constant envelope composite signal, comprising:

means for generating a plurality of modulating signals, wherein said means for generating is programmable to facilitate modification of signaling parameters;

means for separately modulating a plurality of component signals in accordance with the modulating signals; and means for combining the component signals to form the constant envelope composite signal.

39. The apparatus of claim 35, wherein the modulating signals are baseband signals.

40. The apparatus of claim 35, wherein the component signals are in-phase and quadrature components of an RF carrier signal.

41. The apparatus of claim 35, wherein the modulating signals contain global positioning information.

42. An apparatus for generating a constant envelope composite signal, comprising:

means for generating a plurality of modulating signals, wherein the plurality of modulating signals includes plural information signals and an intermodulation product signal that is a function of the plural information signals;

means for separately modulating a plurality of component signals in accordance with the modulating signals; and means for combining the component signals to form the constant envelope composite signal.

43. An interplex modulator, comprising:

a waveform generator configured to generate a plurality of modulating signals including plural information signals and an intermodulation product that is a function of the plural information signals;

a plurality of modulators configured to respectively modulate a plurality of component signals in accordance with the modulating signals;

a plurality of attenuators corresponding to the plurality of modulators, said attenuators scaling the component signals to establish a predetermined power ratio among the component signals prior to combining; and a signal combiner configured to combine the component signals to form a constant envelope composite signal.

44. The interplex modulator of claim 43, wherein said modulators are binary phase shift keying modulators.

45. The interplex modulator of claim 43, wherein said waveform generator is programmable to facilitate modification of signaling parameters.

46. A constant envelope composite global positioning signal, comprising:

an in-phase component modulated by at least a first modulating signal; and a quadrature component modulated by at least a second modulating signal;

wherein one of said first and second modulating signals is an information signal containing global positioning information and the other of said first and second modulating signals is an intermodulation product signal.

47. The composite constant envelope global positioning signal of claim 46, wherein said in-phase component is modulated by a third modulating signal containing global positioning information and said quadrature signal is modulated by a fourth modulating signal containing global positioning information.

* * * * *